I. N. PYLE.
Whiffletree Hook and Clip.

No. 163,945.  Patented June 1, 1875.

WITNESSES:
E. Wolff
A. F. Terry

INVENTOR:
Isaac N. Pyle
BY Munn & Co
ATTORNEYS.

THE GRAPHIC CO. PHOTO-LITH. 39 & 41 PARK PLACE, N.Y.

UNITED STATES PATENT OFFICE.

ISAAC N. PYLE, OF DECATUR, INDIANA.

IMPROVEMENT IN WHIFFLETREE HOOKS AND CLIPS.

Specification forming part of Letters Patent No. 163,945, dated June 1, 1875; application filed April 10, 1875.

*To all whom it may concern:*

Be it known that I, ISAAC N. PYLE, of Decatur, in the county of Adams and State of Indiana, have invented a new and useful Improvement in Wire Clips and Hooks, of which the following is a specification:

This invention relates to new and useful Improvements in the construction of clips and hooks for double-trees; and it consists in making the clips and hooks of wire, as illustrated in the annexed drawing.

Figure 1:
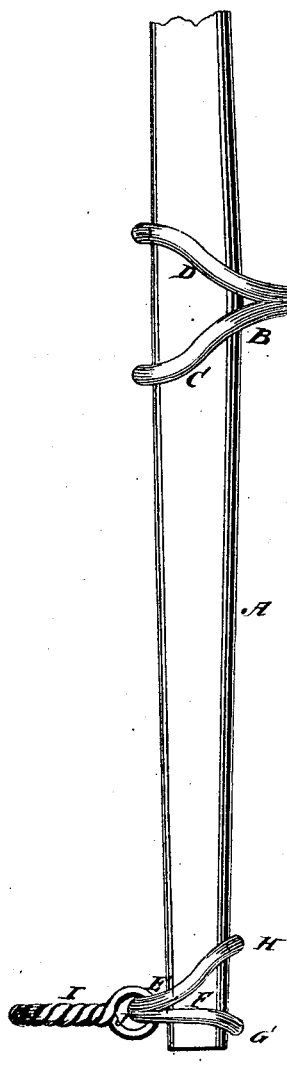
Figure 2:
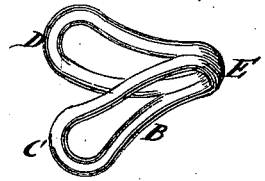
Figure 3:
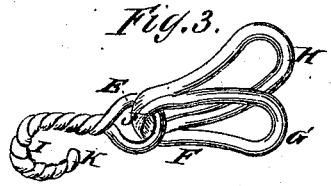

Figure 1 is a view of a portion of a double-tree having my improved clips attached. Fig. 2 is a view of the center clips detached. Fig. 3 is a view of the end clip and hook detached.

Similar letters of reference indicate corresponding parts.

A is the double-tree. B is the center clip, by which the double-tree is attached to the vehicle or other article to be drawn. This central clip is formed of two rings of wire, C and D, which are spread apart on one side, and welded together on the opposite side, as seen at E, and then it is slipped onto the middle or center of the double-tree, as seen in the drawing. F represents the end clips, which are made in a similar manner, but one ring or part, G, being nearly on the line of draft, and the other, H, being spread toward the center of the double-tree, as shown in the drawing. I are the whiffletree-hooks attached to the clips F, and made of single pieces of twisted wire having eyes J, from which they are twisted to the ends K, which ends are welded or soldered together. It is not absolutely necessary that the parts of the clips should be welded, as described. They may be properly shaped and left separate, or they may be made in any other form, so that they answer the desired purpose, but I prefer to make them as described.

These clips and hooks are made of small gage-wire, and are very cheap and durable, more durable, in fact, than the clips and hooks made in the ordinary manner.

I am aware that it is not new to make a single cast-metal clip with two loops that embrace the single-tree, and one that receives the hook, but these are not adapted to whiffletrees of varying size, nor can they be tightened or loosened by one or more blows of a hammer, like mine.

Having thus described my invention, I claim as new and desire to secure by Letters Patent—

1. A clip formed of two wire wrought-metal rings, spread apart at one end and welded together at the other, to adapt it to different sizes of single-trees, substantially as set forth.

2. The end clip F, consisting of two rings, G H, in combination with a twisted and double wire hook, F, substantially as and for the purpose set forth.

ISAAC N. PYLE.

Witnesses:
 JOHN T. FRANCE,
 HENRY C. DENT,
 L. J. RASMUSSEN.